Patented July 20, 1926.

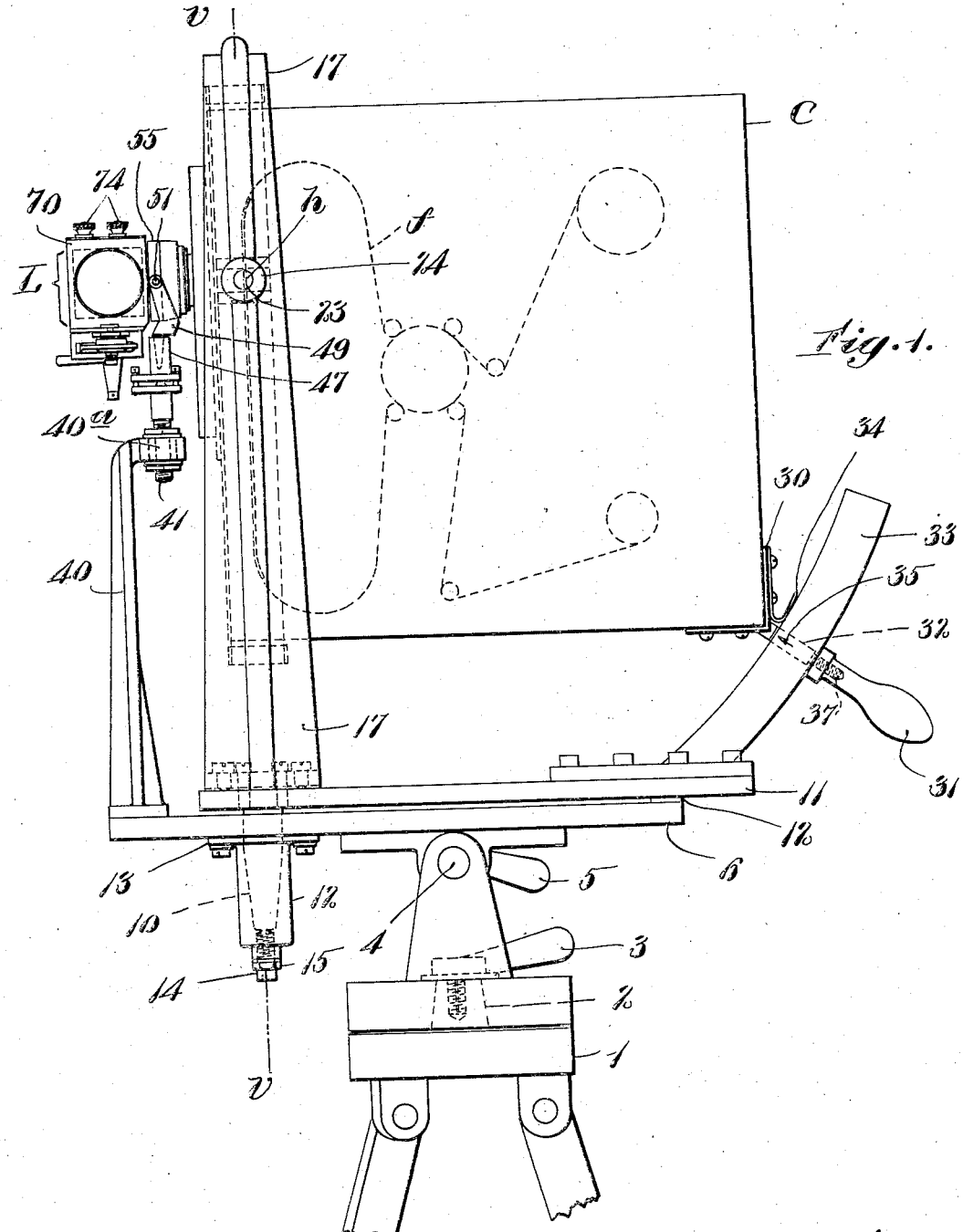

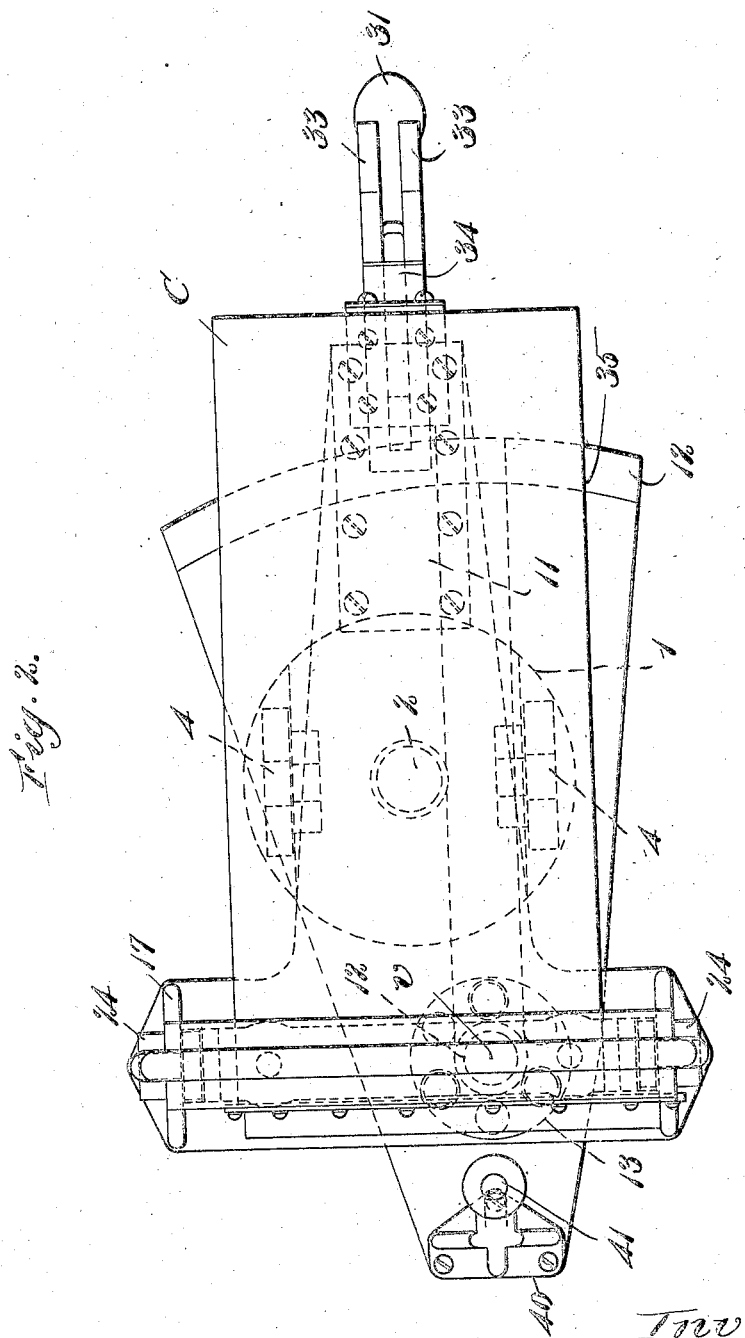

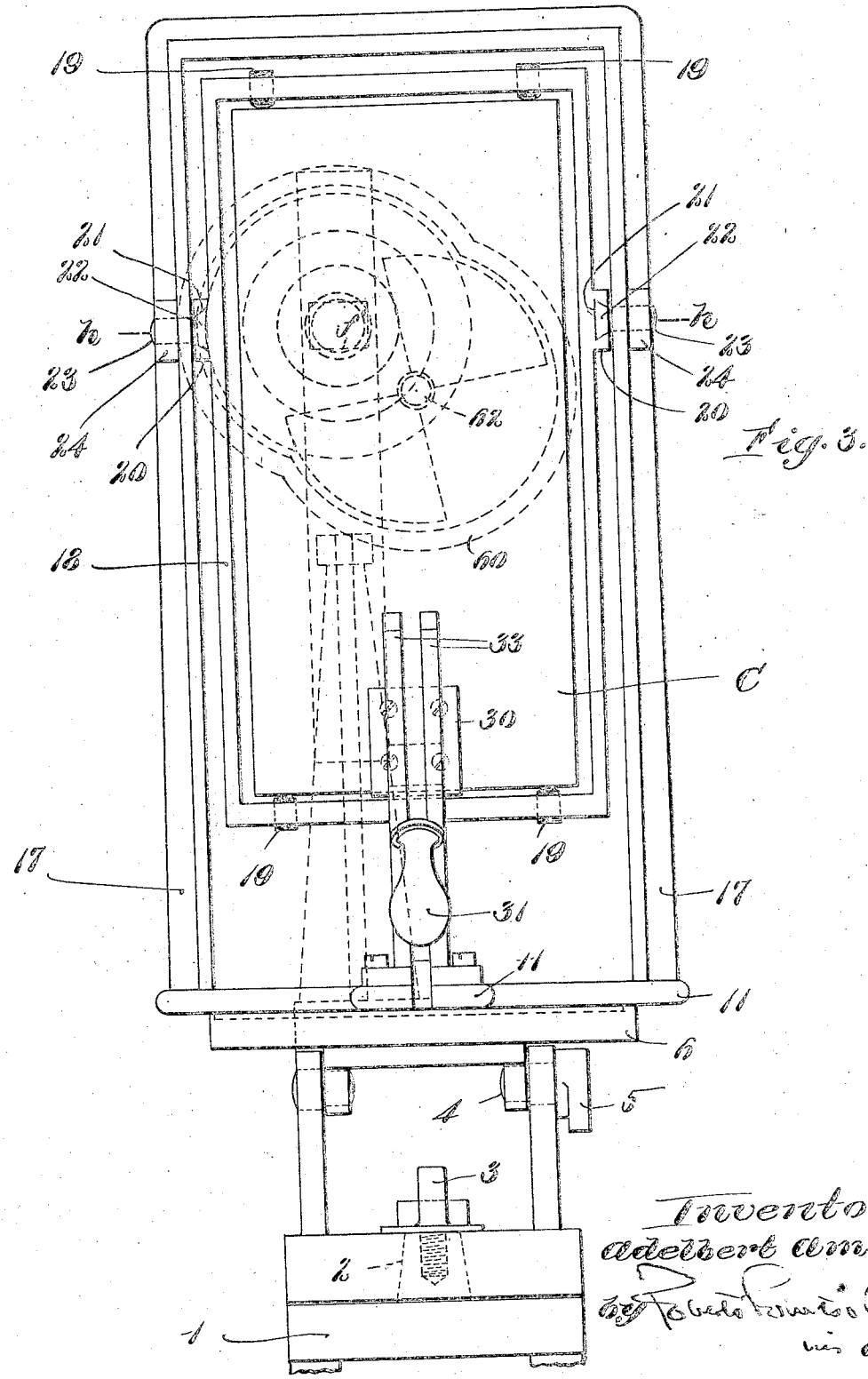

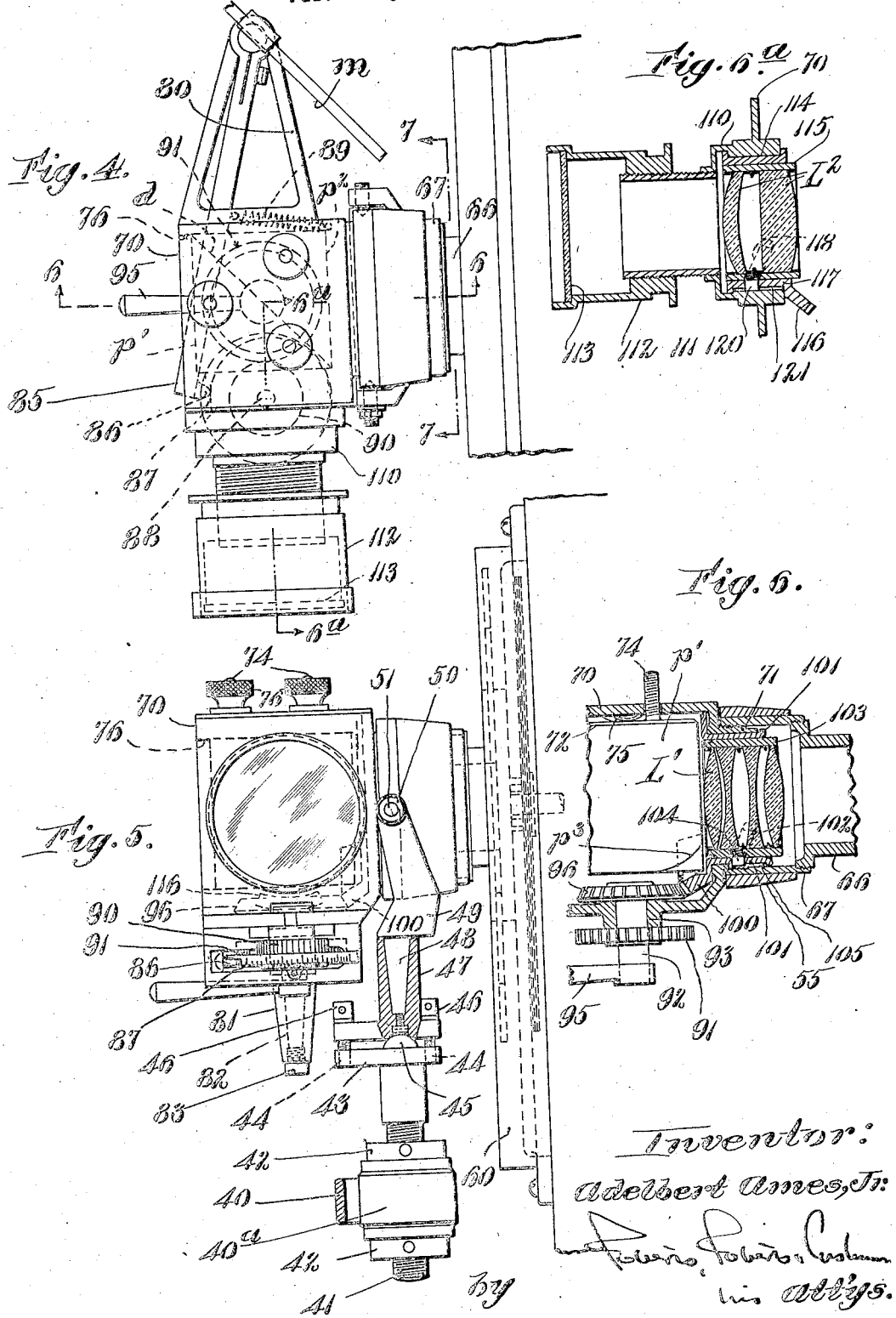

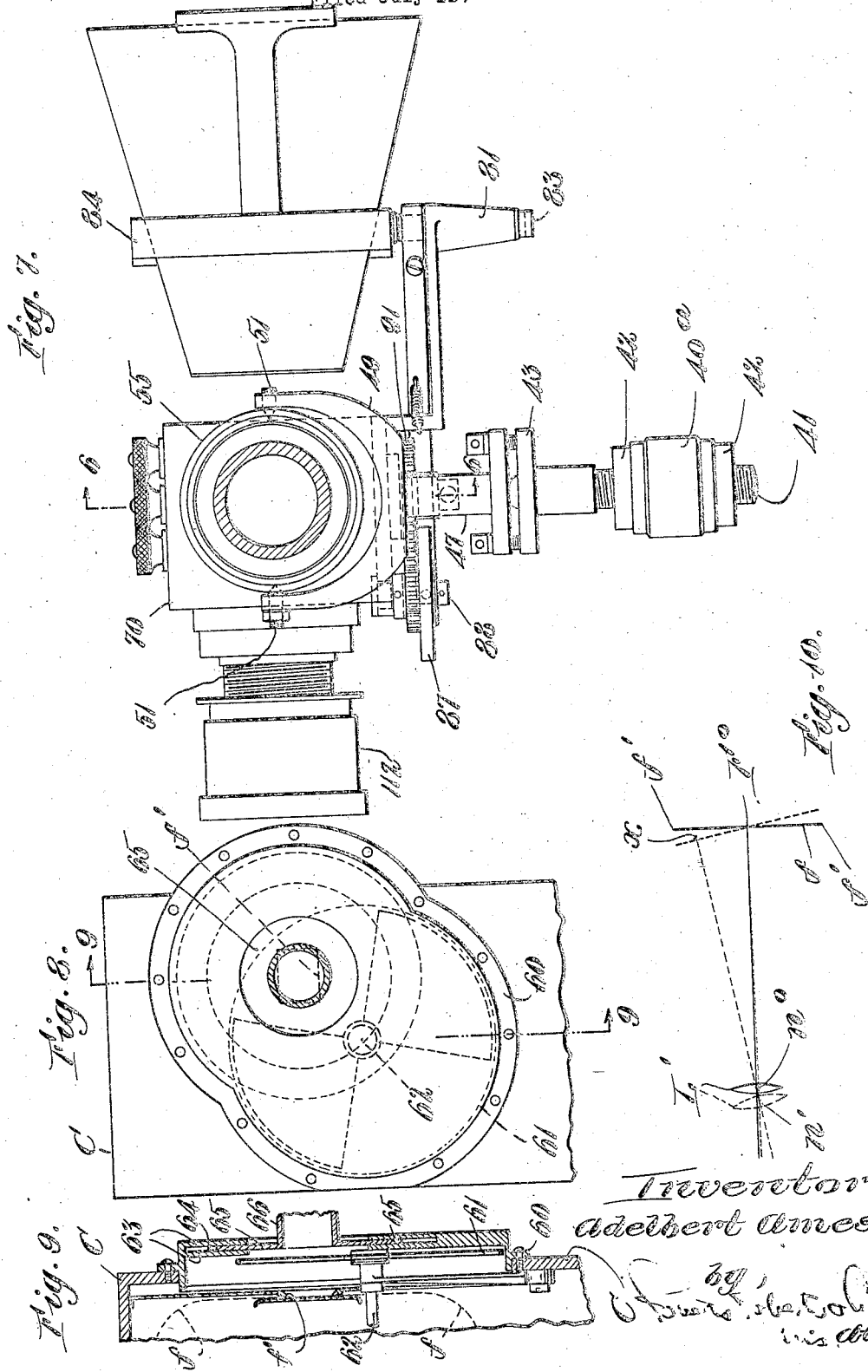

1,593,052

UNITED STATES PATENT OFFICE.

ADELBERT AMES, JR., OF HANOVER, NEW HAMPSHIRE.

CAMERA.

Application filed July 11, 1921. Serial No. 483,649.

This invention relates to photographic cameras and particularly relates to photographic cameras adapted to photography in which it is designed to distinguish the center of interest in the object field from other objects in the object field by a difference in the character of the image of the center of interest.

In ordinary photography the lenses used are corrected lenses, and the image sought is a plane projection of the objects in the object field characterized by accurate definition of detail, freedom from linear distortion, (by which I refer to the disproportionate displacement or curving of straight lines in the margins of the object field, for example) : freedom from aberrations due to astigmatic distortion, and freedom from lack of definition due to the spherical or chromatic aberrations of the refracting glass lenses. While these qualities, which are more or less approached by the images from commercial photographic lenses, are well known in the art and of distinct utility, they do not lend themselves to the artistic or illusive portrayal of many classes of familiar objects, and particularly they do not lend themselves to the exigencies of dramatics for motion pictures. In this case, the natural attention of the observer to a display of the ultimate picture made is often, if not invariably, centered upon a particular part of the three-dimensional object field. His attention may rest upon a person or thing in the near foreground; or upon a person or thing in the axial center of the picture space, or eccentrically disposed in the picture space. The illusion of reality is seriously hampered by the display upon the screen of too-completely-visualized detail, in monocular and flat pictures having no sense of depth between too-completely focused objects at different distances from the point of view, and lacking the stereoscopic relief, the aberrations and distortions at angles from, and at fore-and-aft distances from, the actual center of interest, such as are characteristic of binocular human vision, and which the observer unconsciously expects to find in the displayed picture.

I have heretofore explained in my application Serial No. 351,011, filed January 12, 1920, Letters Patent No. 1,482,502, dated February 25, 1924, the optical considerations concerned in normal human vision, and a method of forming photographic images having the aberrations and distortions of normal monocular human vision. In my application, Serial No. 452,274, filed March 14, 1921, I have further explained a method or art and the picture which is its product by which advantage can be taken of a properly constructed lens adapted to give the distortions and the aberrations of the human eye to place the center of interest at parts of the image selected at will by the photographer, so that the optical or artificial center of interest in the image shall coincide with the nature of the dramatic or selected center of interest in the three-dimensional object-field space.

In my application Serial No. 452,273, filed March 14, 1921, I have further explained the method and the product of the method of obtaining the illusion of binocular vision by means of a single composite photograph having upon it the registered images corresponding to the image perceived by simultaneous binocular vision; and in my application jointly with Charles A. Proctor, Serial No. 474,560, filed June 2, 1921, Letters Patent No. 1,479,211, dated January 1, 1924, we have explained a reflection apparatus for obtaining such binocular composites utilizing a lateral reflector.

The present invention concerns a camera including apparatus for the practice of the several methods and the making of the several products above mentioned and includes, as well, further capacities and facilities for enabling the photographer to make pictures, which may be motion pictures, in which the center of interest of the object field is followed by the center of definition in the photographed image, and the eccentric aberrations of binocular vision are properly rendered in the other parts of the image.

One object of the present invention is to provide apparatus which will reduce and simplify so far as possible the attention to adjustments required of the operator of the camera, so that during photography the selection and depiction of the center of interest by the methods adverted to may be within the easy performance of the average operator.

I shall now explain the invention by way of example only in connection with one specific construction of camera shown in the accompanying drawings, in which:—

Figure 1 is a side elevation of a camera according to the invention;

Figure 2 is a plan of the devices shown in Fig. 1;

Figure 3 is a rear elevation of the devices shown in Fig. 1;

Figure 4 is a detail plan of the mounting for the optical elements of the camera;

Figure 5 is a side elevation partly in central vertical section of the devices shown in Fig. 4.

Figure 6 is a vertical axial detail section on the line 6—6 of Figs. 4 and 7;

Figure 6ª is a diagram showing the relations of lens and sensitive surface for differently placed centers of interest;

Figure 7 is an elevation in section on the line 7—7 of Fig. 4;

Figure 8 is a detail front elevation explaining the relation of the lens mounting to the shutter;

Figure 9 is a section on the irregular plane 9—9 of the devices shown in Fig. 7; and Figure 10 is a diagram showing the relations of lens and sensitive surface for differently placed centers of interest.

Referring now to Figs. 1, 2 and 3, a camera box C is arranged as usual to be movable in azimuth and in altitude about a tripod head 1, for example to rotate on the vertical clamping cone bearing 2, to be clamped in place by the clamping lever 3; to rotate on the horizontal axis 4, and to be clamped in place by the clamping lever 5. These parts, instead of directly carrying the camera box as usual, provide supports for a primary bed-plate 6, which bed-plate independently carries a mounting for a lens system generally indicated at L, and a universal mounting for the camera box C. The camera box C is arranged for universal motion about a central point F⁰, Fig. 10, at the intersection of vertical and horizontal dimensions of the sensitive surface, as of a motion-picture film f, where exposed to the image in a film gate f¹ indicated in Fig. 3. In the preferred arrangement this point is the intersection of a vertical axis on a line v, v, Figs. 1 and 2, with a horizontal axis h, h.

The vertical or azimuth axis v, v, is defined by the cone pivot 10, Fig. 1, projecting from the bottom of a secondary bed plate 11, which also rests upon and can be swung upon a segmental track 12 central at 10, and mounted on the bed plate 6. Preferably the pivot 10 takes into a cone bearing in a gland 12, screwed on the under side of the plate 6, which may be provided with a step bearing screw 14 and a lock nut 15. The system comprising the subordinate bed plate 11 is thus rotatable in azimuth as a whole upon the line v, v, and moves upon its bearings 10, 12 with sufficient friction to remain where placed against considerable stresses.

On either side of the plane defined by the crossing axes v, v, and h, h, a yoke 17 of any suitable light metallic construction is erected on the upper side of the subordinate bed plate 11. The space within the yoke 17 is sufficient to permit independent motion in altitude of the camera box C through an arc of 20°, more or less. Motion of the camera box C in respect to the yoke 17 and about the axis h, h, as a center may be arranged for in any suitable way, but I prefer to mount the camera box C for adjustment in a frame 18 provided with adjustable pinch screws 19 adapted to fix the camera C adjustably in the frame 18, which in turn is provided with lugs 20 having dove-tailed ways 21, 21, for sliding gibs 22, 22, upon which aligned studs 23, 23, are rigidly mounted and adapted to serve as trunnions taking into suitable bore holes in bosses 24, 24 of the frame 17. The gibs 22 and studs 23 are arranged to be stiffly held in their ways 21, and are brought into alignment with each other and with the internal position of the sensitive surface of the film, so that when the camera is assembled the bore holes for the studs 24 defining the axis h, h, are in a plane of the axis v, v. Motion of the camera box C about the axis h, h, or the axis v, v, or both, is now possible without altering the position in space of the central point F⁰ of the sensitive surface in the film gate, or other sensitive surface, plate or film holder.

The camera box C is arranged to be stiffly held in its altitude adjustment about the axis h, h, by suitable means. For example, the lower rear corner of the camera box is provided with a V-plate 30, upon which is rigidly mounted an operating handle 31 having a squared shank 32 taking between the prongs of a sector fork 33 rigidly mounted on the subordinate bed 11. Between the V-plate 30 and the sector 33 a stiff friction spring 34 reacts, to hold the camera box C in its adjusted position about the axis h, h. The handle 31 is bored and threaded to act as a clamping nut on the threaded end 37 of shank 32. The inner face of the sector 33 is struck from the axis h, h, as a center. If desired, one or both faces of the fork 33 may have graduation marks, and the track 12 on the base 6 may be provided with graduation marks, by which the altitude and azimuth angles respectively may be read. In practice one mark 35 to indicate the normal position in which the lens axis is perpendicular to the film at the point F⁰ is usually sufficient.

The bed plate 6 may carry a suitable vertical bracket 40, see Figs. 1, 5 and 6, having a lug 40ª vertically bored and faced to receive a vertically placed screw stud 41 adapted to be locked in vertical adjustment in respect to the bracket 40 by lock nuts 42, 42, taking against the upper and lower machined faces of the bracket lug 40ª. Integral with or attached to the stud 41, a plate 43 is provided with three threaded holes 44, and with a central spherical boss 45, respectively to receive leveling screws 46 and to enter a depression in the bottom of a cone bearing member 47 for the vertical pintle 48 of a bearing fork 49 having aligned threaded horizontal bores 50, for cone-pointed pivot screws aligned with the plane of the axis of the pintle 48.

The structure 47, 48, 49, 51, provides a mounting for universal motion for a sleeve 55, having diametrical disposed depressions into which the cone screws 51, 51 take. The sleeve 55 may thus rotate about the vertical axis of pintle 48, or about the horizontal axis of screws 51. The sleeve 55 carries the entire optical system and determines the direction, and, for any given focal adjustment the position in space, of the lens-mounting proper. The adjustment 45, 44, 41, permits the position of the horizontal axis 51, 51 and the vertical axis of pintle 48 to be brought accurately into the desired relation with the axes $v$, $v$, and $h$, $h$, above mentioned. The distance from the point of crossing or center of motion of the system 48, 49, 51, 51, 55, from the intersection of the axes $v$, $v$, and $h$, $h$, remains fixed in any position of the camera, and is selected to conform to the focal distance between the nodal point of the camera lens and its image plane for a point at a distance representing the most frequent distance of the center of interest. The axis 51, 51, and the axis of the pintle 48 thus usually pass through the nodal point of the lens, and always pass near it, whatever focal adjustment of the lens in respect to the sleeve 55 may be performed.

The universally movable sleeve 55 is arranged to change its direction and its relative position with respect to the camera box C and the film in the film gate $f^1$ in response to the motion of the camera box about the axes $v$, $v$, and $h$, $h$, respectively, for the purpose of bringing the optical axis of the lens in alignment with the sleeve 55 into perpendicular relation to any desired point of the film in the film gate $f^1$.

One preferred way of doing this is to so mount the lens on the camera that it has freedom of motion in respect to the camera box in a plane parallel with the film, and in no other direction. The effect of the universal-motion device 49, 51, 51, 55, is to hold the mounting of the lens in a fixed position laterally during angular motion of the lens axis about a point near the nodal point, as induced by any change of position of the camera box. Under these circumstances rocking motions of the camera about the vertical or the horizontal axis or both, will result merely in bringing the line defining the axis of the lens into perpendicular relation to different parts of the film, but will not substantially change the position in space of the line joining the center of the film gate and the nodal point of the lens, nor will such shifting produce any change in the distance between the nodal point of the lens and the film and thus alter the focus.

In the preferred device, the front of the camera box is provided with an attached housing 60, Figs. 5, 8 and 9, constituting a cell for the usual focal plane shutter 61, rotating on an axis central at 62, and having in front of the space for the rotation of the shutter annular walls 63, 63, defining between them a slot 64 for an annular flange 65 integral with or attached to the tube 66 in which the lens is mounted.

The annular flanges 63, 63, together with the flange 65 in tube 66, constitute a light proof mounting for the lens giving the lens freedom of motion in a plane parallel to the film in the film gate at a fixed distance therefrom.

The focal distance of the lens from the sensitive surface is subject to change for the purpose of focusing on objects at different distances along the axial line of the lens. Preferred means for focusing presently to be mentioned include means for moving the lens in the direction of the axis in respect to the tube 66, whatever the position of the tube 66 with respect to the support of the lens and bracket 40, and whatever the position of the axis of the lens with respect to the film gate.

As referred to above the camera preferably includes not only means for shifting the axial position of the lens with respect to the exposed portion of the film but also includes means for exposing the film to a composite binocular image made by division of the light and reflection, so that beams of light diverging from the same point in the object field to different laterally separated points of view are brought independently to focus by the full aperture of the lens. The camera therefore includes one device for relating the front focal distance (or distance between the nodal point of the lens and a selected object in the object field) to the adjusted position of reflection means adapted to produce a second image by the same lens from a laterally separated point of view, the virtual axis of the reflected image being convergent upon the real axis of the lens at the point in question in the object field.

The reflection and light dividing optical system may correspond to said Ames and Proctor application Serial No. 475,560, in essential respects, and preferably contains as an attachment to or axial fixity in relation to the lens a prism box 70, Figs. 1, 4, 5, 6 and 7, which may be attached to the lens tube 66, see Fig. 6, by being provided with a threaded tubular extension 71 screwed into an exterior slide connection 67 in turn fast upon the tube 66. The slide member 67 engages the sleeve 55 interiorly and is free for longitudinal motion therein, but is not free for axial motion in respect thereto.

The prism box 70 serves as a mounting for two 45° prisms $p^1$ and $p^2$, Fig. 4, whose hypothenuse faces are cemented together, and are provided with a light-dividing, partly transmitting and partly-reflecting surface $d$, which may be a half-silvered or a half-platinized surface on either or both of the meeting faces of the prisms. The structure $p^1$, $d$, $p^2$ constitutes a cube diagonally divided by the surface $d$, and having four plane optical surfaces on its vertical sides, the adjacent surfaces being at right angles. The lower inner corners of the prisms $p^1$, $p^2$ may be cut away outside of the round area of the surface opposite the aperture of the lens as shown at $p^3$ Fig. 6. The prism box is open through apertures 76 central on the lens axis and on a line at right angles thereto respectively.

The prism block $p^1$, $p^2$, is mounted for adjustment in the prism box 70 in any convenient way, as shown by being cemented on its upper surface to an adjustment plate 72 provided with three threaded studs 74 between which a convex spring 75 provides a central rocking point for adjustment, which can be effected by the thumb-nuts 76 on the respective studs 74. When the prism block is in adjustment the light dividing surface $d$ is vertical, substantially central on the lens axis and substantially at 45° thereto.

On that side of the prism box 70 toward which the face of the surface $d$ turned toward the camera is also presented, a bracket 80 is provided having a depending cell 81 for a cone bearing 82 and step-screw 83 at the bottom of a vertical frame 84 in which a plane mirror $m$ is carried with its plane silvered surface $m$ in line with the vertical axis of bearing 82. The mirror $m$ may be turned about this axis in azimuth by an arm 85 having a follower 86, spring-pressed in one direction by a light spring 89 in contact with a cam 87 arranged to rotate on a depending stud shaft 88, Figs. 4, 5 and 7, suitably secured to the prism box 70. The cam 87 is a spiral whose radius varies directly in proportion to its vector angle. Integral with the cam 87 or attached thereto is a pinion 90 meshing with a larger gear 91, Figs. 4, 5, 6 and 7 fast on a depending shaft 92 having a bearing at 93 centrally under the prism $p^1$, $p^2$ in the box 70. Suitable means such as a forwardly projecting handle 95 is provided for rotating the shaft 92, gear 91, pinion 90 and cam 87, in unison with the motion of the beveled pinion 96, Fig. 6, fast to the upper end of shaft 92. The pinion 96 engages means for focusing the lens $L^1$, which preferably is of the type of my said application Serial No. 452,274.

Referring now to Fig. 6, one convenient means for adjusting for focus the position of the lens comprises a sector bevel gear 100 having a bearing within the nipple 71 of the box 70, this bearing comprising a barrel 101 in which is at least one spiral cam slot 102. The lens $L^1$ is mounted in a cylindrical tube 103 provided with one or more radial studs 104, passing through the respective cam slots 102 in barrel 101. One of these studs 104 engages a longitudinal keyway 105 in the nipple 71, by which to prevent the lens tube 103 from rotating with the sector gear 100 and its cam barrel 101. Motion of the handle 95 therefore moves the lens $L^1$ axially a distance corresponding to the slope of the cam slot 102 and the degree of rotation of the handle 95.

By reason of the train of gearing 91, 90, cam 87, the mirror $m$ is coordinately moved to an angle varying from 45° to a line parallel to the axis of the lens $L^1$ to a lesser value, in accordance with the linear removal of the lens $L^1$ away from the film. The step-up gearing 91, 90, permits a greater rotation of the cam 87 than of the handle 95, for the purpose of permitting greater accuracy of adjustment. The focal distances may be marked as a scale on a face of cam 87, as shown in Fig. 5.

It will be apparent that reflection of an object along the axis of the lens $L^1$ and the mirror $m$ and in the surface $d$ coincides with the direct view of the object along the axis of the lens $L^1$, and a change of focus of the lens $L^1$ for an object nearer to or further away from the camera results in the appropriate angular position of the mirror $m$, so that the reflected image and the transmitted image formed by the lens $L^1$ coincide at the object respectively focusing upon and converging upon by the reflected and transmitted light.

For the purpose of observing coincidence of the images which, as will now be apparent, is also an index of correct focus on the film, I prefer to provide the apparatus with finder means for forming a coordinate composite image having in it the component images formed on the film, and available for direct observation. Referring now to Figs. 4 and 6ª provision is made for utilizing the light reflected from the mirror $m$ and transmitted through the light dividing surface $d$ and the light reflected from the front surface of the light dividing surface $d$ coaxially with the reflected beam. On an extension 110 of the box 70 a screw threaded nipple 111 is attached, to carry a finder tube 112, provided with a focal-plane screen 113, which may be of ground glass, upon which, or at the place of which, the image may be observed directly or by suitable well known optical devices. Within the extension 110 in a seat in a bearing 114 a lens tube 115 is provided to carry the finder lens $L^2$. The lens tube 115 is arranged to be moved coordinately with motions of the lens $L^1$ and may be of the same constants as regards focal distance as the photographic lens $L^1$. A convenient way of moving the lens $L^2$ for focus is to provide a gear sector 116 meshing with one side of the beveled gear 96 the sector 116, being integral with or attached to a barrel 117 held in the bearing 114 and having a cam slot 118 to take over the stud 120 fast in the lens tube 115 and reaching into a longitudinal keyway 121 in the extension 110 of the box 70, for focusing the finder lens coordinately with the photographic lens.

By observation in this finder device the images are discovered to be coalesced upon the desired center of interest. It will be obvious that the axis of the photographic lens $L^1$, and its apparent axis as reflected in the mirror $m^1$ also converge upon the desired object, and it will also be apparent that, since this relationship of convergence is associated with correct photographic focus at the convergence point, the attention of the operator may be given wholly to convergence, and not concentrated upon focus. For small-scale images, no matter how brightly illuminated, the observation of good registry or coalescence in the components of the composite image is relatively an easier observation than that of good focus; the use of the coalesced images to indicate focus is a distinct advantage as a convenience to correct focus.

It will be obvious that the handle 95 for adjusting the focal distance and the convergence point of the two points of view of which pictures are taken as composites, can be moved by any desired form of connection from either side or the rear of the camera if convenience should require. In practice, the focal distance of the convergence point or center of interest in the object is found to change relatively infrequently, and the handle 95 in front of the camera is not inconvenient.

The lateral position in the field of view of the center of interest, however, continuously shifts, especially in dramatic productions. As mentioned above one of the purposes of this device is to enable this center of interest to be followed within the field of view subtended by the film gate $f'$ and the angular margins struck through the point $n^0$, Fig. 10, which is the crossing point of the horizontal axis 51, 51 and the vertical axis 48 of the lens supporting system. The primary adjustment of the camera by means of the tripod head and bed plate 6 fixes in space the direction between the center of the film gate represented in Fig. 10 at $F^0$ and the said point $n^0$.

Suppose now the interest in the picture becomes concentrated in the lower part of the object field. The operator aims the camera box C, independently of the position of the bed plate 6, at the point of interest, by lifting on the handle 31. The effect of this, as shown in Fig. 10, is to tip the film forward to the dotted line position central on $F^0$, to move the nodal point of the lens system forward through the minute distance $n^0$, $n^1$, and to change the virtual position of the axis of the lens $L^1$ from the direction $a$ to the direction $a^1$. In this new position the lens is perpendicular to the upper margin of the film gate space $F^1$ at point $x$, and the center of interest is defined by the better definition at the axial region of the lens, and further defined by the coalescence or matching point of the reflected and transmitted beams, from the stereoscopic or binocular devices $d$, $m$. The well-defined center of the image has thus been moved upward from the point $F^0$ to the new point $x$ near the margin of the film gate, and may be so moved to any point. This motion of the center-of-interest point has resulted without substantially changing the direction of the line $F^0$ $n^0$, the shift to the direction $F^0$ $n^1$ being negligibly slight. The picture margins have therefore remained where they were before.

The relations shown in Fig. 10 also apply to lateral motion of the camera box in respect to the relatively fixed bed plate 6. The handle 31 is also the handle for moving the camera in azimuth about its vertical axis $d$—$d$. In effect, then, the unconscious pointing of the camera C by the operator in its alt-azimuth mounting at the center of interest may be relied upon automatically to shift the attention point in the picture as the exigencies of the picture being photographed may require. The effect, in the projected position, is that of looking at different points successively in the field of view, and the illusion of doing this is independent of the subtended angle of the screen image and other fortuitous factors, and is an inherent quality of the original negative.

What I claim is:—

1. A camera having therein a lens forming images differing in character at axial and at marginal parts of the image, means to support a sensitive surface to receive the image, and means to support the lens for freedom of motion in respect to said supporting means, whereby the axial direction of said lens and the angular position of said surface may be coordinately shifted respectively about a point in said surface and a point near the nodal point of said lens, and means for maintaining the distance of said lens from said surface during such shifts of position without substantially altering the direction in space between a center of motion for said surface and the center of motion for said lens.

2. A camera having therein a lens and means to support the lens, means to support a sensitive surface, means whereby the angular position of the sensitive surface may be changed in respect to a center of motion, and means for changing the axial direction of the lens coordinately, in combination with means acting to maintain substantially unchanged the direction in space between the center of motion of said surface and the nodal point of said lens.

3. A camera having therein a lens and means to support the lens, means to support a sensitive surface, and means whereby the angular position of the sensitive surface may be changed, in combination with means acting to maintain unchanged the angle between said surface and the axis of said lens, and the direction in space between the center of motion of the surface and of the lens.

4. A camera having therein a lens and means to support the lens, means to support a sensitive surface, means whereby the angular position of the sensitive surface may be changed in respect to a center of motion, and means for changing the axial direction of the lens coordinately, in combination with means acting to maintain substantially unchanged the direction in space between the center of motion of said surface and the nodal point of said lens, and with means acting to maintain the distance between said nodal point and said surface at a constant value.

5. A camera adapted for photography in which the definition characteristic of different parts of the image is utilized to distinguish at will the different appearances of the center of interest and the outlying parts of the field of view, having therein a lens and means for supporting the lens, means permitting the axis of the lens to be directed to any part of the field of view, and means for supporting a sensitive surface adapted to permit said surface to conform to a constant axial direction by motions in an angular sense about axes in different dimensions intersecting substantially in said surface.

6. A camera having therein a lens and means for supporting the lens, means permitting the axis of the lens to be directed to any part of the field of view, by universal motion about a point on the axis of the lens, and means for supporting a sensitive surface adapted to permit said surface to conform to a constant angle to said axial direction by motions in an angular sense about axes in different dimensions intersecting substantially at said surface and at a constant distance from said point.

7. Photographic apparatus comprising a camera, a support therefor, a camera box universally mounted in respect to said support, and a lens universally mounted in respect to said support, the centers of said universal mountings being at a constant distance apart.

8. Photographic apparatus comprising a camera, a support therefor, including a bed plate adapted to be moved on said support to direct the camera, a camera box universally mounted in respect to said bed plate, and a lens universally mounted in respect to said bed plate, the centers of said universal mountings being at a constant distance apart and at a direction one from the other adapted to be changed by moving said support.

9. Photographic apparatus comprising a camera box having therein a support for a sensitive surface, means for mounting the camera box for angular motion in altitude and in azimuth on axes intersecting substantially in said surface; a lens, and a mounting for the lens comprising means permitting universal motion of the lens about a center on its optical axis in any position of the lens, said center being at a constant distance from the intersection of said altitude and azimuth axes.

10. Photographic apparatus comprising a camera box having therein a support for a sensitive surface, means for mounting the camera box for angular motion in altitude and in azimuth on axes intersecting substantially in said surface; a lens, and a mounting for the lens comprising means permitting universal motion of the lens about a center on its optical axis in any position of the lens, said center being at a constant distance from the intersection of said altitude and azimuth axes, and means connecting the lens mounting and camera box adapted automatically to cause the lens to take a position axially perpendicular to said surface in any of its positions.

11. Photographic apparatus comprising a camera box having therein a support for a sensitive surface, means for mounting the camera box for angular motion in altitude and in azimuth on axes intersecting substantially in said surface; a lens, and a mounting for the lens comprising means permitting universal motion of the lens about a center on its optical axis in any position of the lens, said center being at a constant distance from the intersection of said altitude and azimuth axes, and means connecting the lens mounting and camera box adapted automatically to cause the lens to take a position axially perpendicular to said surface and equidistant therefrom in any of its positions.

12. Photographic apparatus comprising a camera box having therein a support for a sensitive surface, means for mounting the camera box for angular motion in altitude and in azimuth on axes intersecting substantially in said surface; a lens, and a mounting for the lens comprising means permitting axial motion of the lens and universal motion of the lens about a center on its optical axis in any position of the lens, said center being at a constant distance from the intersection of said altitude and azimuth axes.

13. The combination of a camera having a lens and means for supporting a sensitive surface, means for adjustably fixing in space the relation of a point on the sensitive surface to a point near the nodal point of the lens system of the camera, and means adapted to shift the position of the sensitive surface about a point therein as a center in every direction; and means acting coordinately therewith to predetermine a perpendicular position of the lens axis to the plane of the sensitive surface.

14. A camera having therein in combination a lens, means for supporting a sensitive surface, a bed-plate, and means on the bed-plate adapted to carry a lens system for universal motion in respect to a point in space related to and defined by the adjustment of the bed-plate, and means movable in respect to said bed-plate for adjusting the sensitive surface angularly about a point in said surface; in combination with means for directing the optical axis of the lens system along a perpendicular to a portion of the sensitive surface corresponding to a particular angular position of said surface.

15. In a camera, the combination with a lens of means for varying the position of the axial region of the image from the lens in respect to a support for a sensitive surface carried by the camera, and means related to and movable with the lens for causing its image to be a composite of images from two points of view, coincidence between the components of said images being in said axial region.

16. In a camera, the combination with a lens of means for varying the position of the axial region of the image from the lens in respect to a support for a sensitive surface carried by the camera, light dividing and reflecting means related to and movable with the lens for causing its image to be a composite of images from two points of view, coincidence between the components of said image being in said axial region.

17. In a camera, the combination with a lens and a movable support for a sensitive surface of means for varying the position on the said surface of the axial region of the image from the lens by angular motion of the axis of said lens in respect to the center of motion of said surface; and means for focussing the lens comprising means for moving it axially in respect to the center of its angular motion.

18. In apparatus for the photography of composite images the combination with means including an image forming lens, a light dividing surface, and means for forming one image by light transmitted through said surface, and another image by light reflected therefrom, reflector means for one portion of the light, means for moving the lens to focus its image in respect to a predetermined point in the object field, and means adapted to rotate the reflector means according to the different positions of the lens.

19. In apparatus for the photography of composite images the combination with means including an image forming lens, a light dividing surface, and means for forming one image by light transmitted through said surface, and another image by light reflected therefrom, reflector means at one side of the light dividing beam for one portion of the light, means for moving the lens to focus its image in respect to a predetermined point in the object field, and means adapted to rotate the reflector means in azimuth according to the different positions of the lens.

20. In a camera having means for photography of composite images, a lens and ancillary reflecting means for causing convergence of images from different points of view, means for adjusting the reflecting means angularly to cause convergence upon the images of objects at different distances and means for automatically adjusting the focus of the lens in accordance with the angular position of the reflecting means.

21. In a camera having means for photography of composite images, a lens and ancillary reflecting means for causing convergence of images from different points of view, means for adjusting the reflecting means angularly to cause convergence upon the images of objects at different distances, and means adapted coordinately to adjust the angular position of said reflecting means and the axial position of the lens, whereby an object in focus in the image is also at the convergence of the real axis of the lens and the virtual axis as reflected.

22. In a camera, a focussing device comprising parts for axially rotating the lens, coacting parts adapted to move the lens axially when rotated, a cam adapted to move with the motion of one of said parts, and adjustable reflection means cooperating with the lens to form an image thereby arranged to be adjusted by said cam.

23. In a camera, a focussing device comprising as elements means for axially rotating the lens, and coacting parts adapted to move the lens axially when rotated, a cam adapted to move with the motion of one of said focussing elements, a pivoted reflector means laterally displaced from and cooperating with the lens to form an image, and an arm and follower for said cam on said reflector means adapted to be positioned by said cam to control the angular position of said reflector means.

24. A camera having therein means by which the definition characteristic of different parts of the image is utilized by positioning the image differently in respect to the area exposed of a sensitive surface to point out a center of interest in the image, in combination with means for forming two images from different points of view and means for superposing these in registry at said center of interest.

25. A camera having therein means by which the definition characteristic of different parts of the image is utilized by positioning the image differently in respect to the area exposed of a sensitive surface to point out a center of interest in the image, in combination with means for forming two images from different points of view, means comprising reflectors superposing these in registry at said center of interest, and means for causing the reflector system to partake of motions of the lens made for the purpose of positioning the image therefrom.

26. In a camera for stereoscopic effects, the combination of a lens reflection means for obtaining binocular views of the same object, by the same lens, with means for concurrent adjustment of the lens and of the reflection means for coordinating focal adjustment of the lens with variation of the degree of convergence of the axes of view.

27. In a camera for forming composite images by coincident formation of a direct and a reflected image, means for transmitting and for reflecting the beams of light in respect to which the images are formed, and means for simultaneously adjusting the path of one component of the image-forming light in said optical system and the axial position of the lens for focus upon different intersections of the respective optical paths in the object field, whereby to determine coincidence of focus and superposition of the images in respect to different points of the object field.

28. A camera having therein, in combination with a photographic lens, means for transmitting and for reflecting light between the lens and its object field, a primary reflector on one side of said transmitting and reflecting means, and a finder lens on the other side thereof, and means for simultaneously adjusting said lenses for focus.

29. In a camera for forming composite images by coincident formation of a direct and reflected image, means for transmitting and for reflecting the beams of light in and for reflecting the beams of light in respect to which the images are formed, and means for simultaneously adjusting the path of one component of the image-forming light in said optical system and the axial position of the lens for focus upon different intersections of the respective optical paths in the object field, whereby to determine coincidence of the images in respect to different points of the object field, in combination with a finder lens and means for simultaneously adjusting the finder lens to focus its image upon the said intersections.

30. A camera for forming a composite image from a plurality of points of view having therein a photographic lens, a compound prism having parallel entrance and emergent faces across the axis of said lens, an entrance face at right angles thereto, and an inclined surface adapted to reflect and to transmit light, in combination with an image-forming finder lens mounted behind an emergent face of said prism opposite to said last mentioned entrance surface, and means for causing like axial motions of said lenses for focusing simultaneously upon the same objects at different distances.

31. A camera forming a composite image from a plurality of points of view having therein a photographic lens, a compound prism having parallel entrance and emergent faces across the axis of said lens, an entrance face at right angles thereto, and an inclined surface adapted to reflect and to transmit light, in combination with movable reflector means adapted to reflect light from an object in the axial direction of said photographic lens toward said inclined surface, an image-forming finder lens and focal plane screen mounted behind an emergent face of said prism opposite to said last mentioned entrance surface, and means for causing like axial motions of said lenses and appropriate angular motions of said reflector means for focusing and for bringing into coincidence simultaneously the images of the same objects at different distances in respect to both the photographic image and the finder image.

Signed by me at Boston, Massachusetts, this 27th day of June, 1921.

ADELBERT AMES, Jr.